(12) United States Patent
Gatliff

(10) Patent No.: US 6,189,262 B1
(45) Date of Patent: Feb. 20, 2001

(54) METHOD OF TREATING INDUSTRIAL WASTE WATER

(76) Inventor: Edward G. Gatliff, 7355 Dixon Dr., Hamilton, OH (US) 45011

(*) Notice: Under 35 U.S.C. 154(b), the term of this patent shall be extended for 0 days.

(21) Appl. No.: 09/200,381

(22) Filed: Nov. 24, 1998

Related U.S. Application Data

(60) Provisional application No. 60/075,473, filed on Feb. 20, 1998, and provisional application No. 60/066,678, filed on Nov. 26, 1997.

(51) Int. Cl.$^7$ .......................... A01B 79/02; A01G 31/00
(52) U.S. Cl. .......................................................... 47/58.1
(58) Field of Search .................. 47/59, 60, 61, 47/62 R, 62 C, 62 E, 62 N, 63, 64, 65.5, 66.1, 66.5, 66.6, 73, 75, 76, 77, 79, 85, 86, 87, 48.5, 58.1; 210/170

(56) References Cited

U.S. PATENT DOCUMENTS

| | | | | |
|---|---|---|---|---|
| 2,306,027 | * | 12/1942 | Swaney | 47/62 R |
| 3,577,678 | * | 5/1971 | Burton | 47/58.1 |
| 4,169,050 | * | 9/1979 | Serfling | 210/12 |
| 4,192,096 | * | 3/1980 | Platt et al. | 47/73 |
| 4,213,274 | * | 7/1980 | Skaife | 47/81 |
| 4,310,990 | | 1/1982 | Payne | 47/59 |
| 4,839,051 | * | 6/1989 | Higa | 210/602 |
| 4,855,040 | * | 8/1989 | Kickuth | 210/109 |
| 4,920,694 | * | 5/1990 | Higa | 47/58.1 |
| 4,995,969 | * | 2/1991 | LaVigne | 210/150 |
| 5,117,581 | * | 6/1992 | Green et al. | 47/87 |
| 5,266,213 | | 11/1993 | Gillham | 210/747 |
| 5,269,094 | * | 12/1993 | Wolverton et al. | 47/62 R |
| 5,307,589 | | 5/1994 | Rigsby | 47/59 |
| 5,314,638 | * | 5/1994 | Morine et al. | 252/184 |
| 5,362,394 | | 11/1994 | Blowes | 210/617 |
| 5,442,891 | | 8/1995 | Albrecht | 52/745.14 |
| 5,444,940 | * | 8/1995 | White-Wexler et al. | 47/82 |
| 5,453,201 | | 9/1995 | Etzel et al. | 210/668 |
| 5,476,142 | | 12/1995 | Kajita | 166/294 |
| 5,618,413 | * | 4/1997 | Todd et al. | 210/151 |
| 5,667,673 | * | 9/1997 | Hogen et al. | 210/170 |
| 5,702,593 | * | 12/1997 | Horsley et al. | 210/122 |
| 5,733,453 | * | 3/1998 | DeBusk | 210/602 |
| 5,829,191 | | 11/1998 | Gatliff | 47/58 |
| 5,829,192 | | 11/1998 | Gatliff | 47/58 |
| 5,907,925 | * | 6/1999 | Guyot | 47/58.1 |
| 5,919,367 | * | 7/1999 | Khudenko | 210/605 |
| 5,947,041 | | 9/1999 | Licht | 111/200 |
| 5,975,798 | * | 11/1999 | Liskowitz et al. | 405/128 |

OTHER PUBLICATIONS

Weiner, M., *Plant A Tree*, Collier Books, New York, p. 64–66, 70–71, 1975.

Salt, et al., *Phytoremediation: A Novel Strategy for the Removal of Toxic Metals from the Environment Using Plants*, Bio/Technology, vol. 13, No. 5, pp. 468–474, May 1995.

(List continued on next page.)

Primary Examiner—Michael J. Carone
Assistant Examiner—James S. Bergin
(74) Attorney, Agent, or Firm—Lerner, David, Littenberg, Krumholz & Mentlik, LLP

(57) ABSTRACT

Modular cubes with numerous cylindrical cavities include a rooting medium and tree in each cavity, whereby a long and narrow root system is established for each such tree within the confines of the respective cylindrical cavity. Individual cavities are provided for each individual tree, though multiple trees can be in a single cavity. The system could be closed, using all of the water supplied to the tree, or open where unused water is drained from the cavities. A drainage medium can be provided with the rooting medium so that the rooting medium is not lost during drainage of water. The cubes with the vegetation are used to remediate a contaminated site, including discharged industrial waste water. Alternatively, the vegetation might be harvested with its long root system and transplanted at a contamination site, the transplantation being made in any suitable manner, i.e., within the ground, within a cavity of a like cube, or in any other expedient for effecting remediation of the site.

19 Claims, 3 Drawing Sheets

OTHER PUBLICATIONS

*Plant Physiology*, Carey, Wadsworth Publishing Company, pp. 85,87, 1978.

Brady, *The Nature and Properties of Soils*, $10^{th}$ Ed., MacMillan Publishing Company, pp. 17–20, 94–95, 148–150, 205–207, 1975.

Secor International Incorporated, Case History: In–Situ Remediation of Chlorinated Hydrocarbons by Zero–Valent Iron and Funnel–And–Gate Technology.

Reactive Permeable Barrier Using Iron Colloids for the Remediation of Groundwater Contaminants, Daniel Kaplan and Kirk Cantrell, Pacific Northwest Laboratory, 1997.

Schnoor et al.; Phytoremediation of Organic and Nutrient Contaminant; Environmental Science & Technology; vol. 29, No. 7, 1995, 318–323.

Strand et al.; Removal of Trichloroethylene From Aquifers Using Trees; Innovative Technol. Site Rem. Hazard. Waste Manage., Proc. Natl. Conf.; 1995, 605–612 (Abstract Only).

Evergreens, A Countryside Publication.

Biogeochemical Sequestering of Metals and Radionuclides in Zero Valence Iron Barriers, A.V. Palumbo, T.J. Phelps, B. Gu. B. Kinsall, S. Pfiffner, I. Lian S. Brooks and G. Jacobs, Environmental Sciences Division, Oak Ridge National Laboratory.

Kirkman; Basic Gardening Illustrated; 1975, 1–128 (Only pp. 20, 48–53, and 122).

* cited by examiner

METHOD OF TREATING INDUSTRIAL WASTE WATER

This application claims the benefit of U.S. provisional application Ser. No. 60/075,473, filed on Feb. 20, 1998, and U.S. provisional application Ser. No. 60/066,678, filed on Nov. 26, 1997.

BACKGROUND OF THE INVENTION

The present invention relates generally to the treatment of contaminated waste water at or from an industrial site or a landfill leachate, or in any other setting, and also to the growing of trees for earth remediation treatment of waste water, or contaminated soil or groundwater. More specifically, the present invention concerns methods and apparatus for the growth and use of trees for remediating industrial waste water or contaminated soil or groundwater.

The preservation and protection of the environment are among the most paramount social and economic issues affecting our society today. In instances where soil and/or groundwater have been contaminated by industry, the assessment of the contamination must be swiftly implemented, and the remediation of the assessed contamination must be as effective and inexpensive as possible.

Of course, preventing the contamination of soil and groundwater as a proactive step is a logical and extremely important objective. Thus, in most instances, industry is required by regulation to take timely prophylactic measures rather than reacting to contamination later on. Thus industrial waste water, broad term used to encompass any kind of contaminated or potentially contaminated water from an industrial or like setting, must be treated prior to being discharged into a sewer system or anywhere else leading to ultimate discharge into the environment. Presently, techniques for remediation of industrial waste water include the use of activated carbon filters, settling basins, resin columns, waste water lagoons, aeration systems, reverse osmosis, and ultra-filtration.

In such situations, the waste water itself must be treated in some manner before it is discharged into the environment. Otherwise, soil or groundwater water may become contaminated with the constituents contained within the waste water.

The use of vegetation for remediation of contaminated soil or groundwater water is known and is often referred to as "phytoremediation." An explanation of contamination and remediation, and particularly bioremediation (i.e., techniques which take advantage of natural biological processes) is contained within U.S. Pat. Nos. 5,829,191 and 5,829,192. These patents also disclose techniques of applicant for using vegetation to remediate contaminated soil or ground water. These patents are incorporated herein by reference in their entirety as if fully set forth herein.

The techniques described in applicant's above patents can be used to remediate waste water in any setting, including an industrial setting where waste water is discharged from an industrial plant as a by-product of a manufacturing process or other processes.

Vegetation used for remediation purposes is typically not grown in a special manner for remediation purposes only. The above patents disclose certain techniques for growing trees so that remediation is commenced more quickly and efficiently than with other techniques. These techniques and the apparatus used therewith facilitate the growth of a root system which is long, such that when grown at a contaminated site for remediation, the root system and its large surface area is at or substantially closer to the depth or source of contamination. These techniques include the initial growth of vegetation off-site for later transplanting at a contaminated site.

The present invention provides for the efficient use of vegetation for the remediation of a contaminated site or the remediation of discharged industrial waste water. It includes techniques and apparatus which are effective for remediation as well as versatile for adaptation for various applications. In some ways, the present invention builds on and improves the techniques disclosed in the above patents. One aspect of the present invention is directed to the actual remediation of contaminated water, such as discharged industrial waste water or landfill leachate water, and another aspect relates to the growth of vegetation for use in remediation.

SUMMARY OF THE INVENTION

Most waste water generated at industrial or landfill sites must be treated prior to being released into a public system. The present invention relates to the processing of waste water through the use of vegetation contained in a structure through which waste water can flow.

One aspect of the present invention relates to the use of phytoremediation technology as a bioreacter to remediate contaminated waste water discharged as a byproduct of an industrial process or any other contaminated waste water. The present invention can accommodate streams of waste water flowing at any various rate, such as 2.0 gallons per minute or greater (based on initial laboratory conditions—greater flow rates can be developed through multiple modules, adjustments in the material utilized as a soil matrix, to adjust retention, etc. and otherwise). The present invention has a distinct advantage over a lagoon system in that the waste stream treatment is effectively concurrent with flow, resulting in little to no retention time requirements that necessitate storing large volumes of water. It also has a cost and efficacy advantage over many other engineered systems. In another application, such as treating stormwater, the present invention could be used to treat and reduce water volume more effectively than simple evaporation from holding ponds by introducing "islands" of connected modular units that, due to their polystyrene or polyurethane makeup, or the provision of pontoons and/or stabilizers, could be made to float on the pond's surface maintaining a vegetative water extraction treatment capacity regardless of the rise and fall of the pond water evaluation. Of course, the "islands" may not float, but merely be arranged together.

The present invention preferably comprises several units and sub-units, each being modular. In the preferred embodiment, each module is constructed or molded from material with good insulation properties. Materials such as polyurethane or polystyrene provide such insulation properties and will thus protect the root system from temperature extremes or other conditions. Void spaces or cavities are formed in the modules. To allow for reuse of the module, and ease of plant replacement, the void spaces are lined with a flexible plastic which is substantially impervious to liquid or lined with a rigid material such as PVC or cardboard tubing (which in turn can be lined with plastic tubing or flexible plastic). Such constructions restrict moisture and root penetration into the polystyrene or polyurethane material. Under certain circumstances it would be desirable to position a plug in the center of or elsewhere in the void to reduce weight by reducing the volume of the root medium and/or to concentrate the root mass. This simply provides for usage of a module for other applications since the void can be "modified" in this or any other manner.

Given the construct of the modules, trees can be readily replaced in case of vegetation mortality or other loss of treatment efficacy, resulting in virtually no system down time. In addition, the present invention can be effective during colder weather which is a time when many other biological treatment systems become dormant or require either an enclosed structure and/or large amounts of energy in order to maintain growing conditions.

A typical system in accordance with the present invention comprises a tree actively growing in four to five foot deep, 6" diameter cylinders filled with a rooting media appropriate for the waste water treatment and flow requirements. In-situ columns could be 12–24 inches in diameter or more and 5 to 30 feet in depth or more. The rooting activity of the vegetation extends throughout the cylinder's length, providing the advantages discussed in U.S. Pat. Nos. 5,829,191 and 5,829,192. In one embodiment, thirty-six to fifty cylinders are arranged in an upright orientation and would fit neatly on a 4'×4' forklift pallet which would complete a single module.

Waste water to be treated can be delivered to the module and manifolded to supply each cylinder with equal amounts of waste water. In one adaptation of the system, the waste water would be allowed to percolate through the module's cylinders (which, in this case, are not sealed at the bottom). The percolated waste water would then collect in a reservoir located at the base of the module where it would be either pumped through a manifold to the next module, pumped or otherwise fed to a different system for further processing, or discharged. Another adaptation might have the waste water flow upward through the column. In this adaptation, the module could be floating on a lagoon or be stationary in a lagoon, and through a partially open bottom for each cavity water would be permitted to rise to the roots through capillary action.

If a module begins to have little or no remedial effect on the waste water or the vegetation becomes nonviable, then a fresh module or cylinder can be reinstalled in its place. If a replaced module remains viable and can be revitalized it would be returned to use at a later time, otherwise the soil/vegetation contents of the module would be disposed of in a suitable fashion.

The system in accordance with the present invention for remediation of waste water can also be used simply for the growth of trees which will be used for remediation. The trees, which will establish a long and narrow root system as described in the above U.S. patents, can be transplanted to modules and/or cavities similar to those in which they are grown. Alternatively, an entire module already containing a rooting medium and a tree can be transported to a remediation site to remediate waste water of any type.

In a preferred embodiment of the invention, a plurality of trees or other vegetation are consolidated in a module. Any appropriate structure can be used to facilitate the creation of a module. For instance, the trees can be disposed in a plurality of vertically arranged cylinders or other similar containers, or the trees may be planted in cylindrical or other shaped holes formed in large blocks of a material, such as a polystyrene material. A frame could be used to hold the multiple cylinders or other arrangement in place on a platform. Also, a module could consist of a single cylinder or a plurality of cylinders (or other containers). A platform could include or consist of a basin provided at the lower end of the cylinders, and such a basin could be one which holds the waste water after it is processed in the module and awaits further processing or discharge. Alternatively, it could be one which holds water and allows the water to be drawn into the cylinders or cavities by capillary action in an arrangement by which the tree is fed from the bottom, not the top.

The rooting medium provided within the cylinders or other containers may be of any suitable type (see the below-mentioned applications). For example, a soil or any other appropriate organic material can be used. Alternatively, a synthetic or partially synthetic material can be used. The type of rooting medium may be determined by the type of waste water being processed and the flow requirements of the industrial system from which the waste water is generated.

One preferred type of rooting medium is light in weight and is hydrating. By way of example, such a rooting medium is a reed sedge peat, used alone or in a mixture depending upon retention requirements and other factors.

As one skilled in the art will note, there are many variations to the method in accordance with the present invention, as well as to the apparatus in accordance with the present invention. One of the preferred embodiments entails the pumping of waste water from one basin of a module to another, successively, until the waste water has been sufficiently processed that it can be released to a public system.

Incorporated herein by reference are the above-mentioned U.S. Pat. Nos. 5,829,191 and 5,829,192. These patents discuss the use of trees for the remediation of contaminants in soil or groundwater. The contaminants in waste water are processed in the same way as the contaminants discussed in these patents. The methods in these patents may be incorporated within the present invention.

The cylinders or other containers may be of any suitable material, and/or may be lined with other materials such as plastic, preferably a flexible plastic. Such an arrangement is particularly useful where a block of polystyrene is used and cylindrical holes are drilled there through. Lining the holes protects the polystyrene or other material, while the polystyrene or other material exhibits useful insulation properties under different conditions, including cooler conditions.

A method in accordance with the present invention may include the steps of providing vegetation in a structure and causing the waste water to be exposed to the vegetation so that it is processed accordingly. It may also include the steps of providing a plurality of modules having vegetation planted within a rooting media held within at least one container, and causing waste water to feed the vegetation. In a further permutation of the invention, a module may be made up of numerous cylinders or other containers arranged to form that single module. Also, the waste water could be pumped from one module to another until it is sufficiently processed to be released outside of the system.

Objects and advantages of the present invention can be realized by providing an article for growing trees which is made up of a module having at least two cavities for housing rooting medium and root systems of at least two trees. The cavities can be open or closed at the bottom, depending upon the particular application. Alternatively, some cavities may be open at the bottom, while others may be closed. The cavities open at the bottom will discharge water or take water up through that open bottom. The cavities that are closed at the bottom can be supplied with water from the top of the cavity, being supplied only enough water to maintain the health of the tree and its root system.

Such an article can be used for growing trees for remediation purposes or for remediation of contaminated groundwater or soil by the root system as housed and growing within the module.

The article can include the rooting medium and a tree. In a preferred embodiment, the cavities may be elongate such that the root system will grow downward. The root system can establish a long root system within an elongated cavity, or can be planted therein with a long root system, whereby the cavity would maintain such elongate structure of the root system. In a preferred embodiment, whether or not an elongate cavity is used, a flexible liner lining the cavities may be desirable. The flexible liner could be used alone or in conjunction with a rigid liner, depending upon how the module is constructed. For instance, tubes could be used to define the cavities and such tubes might be lined for one reason or another. Alternatively, the cavities might be formed in a block of material, the block of material preferably having insulating properties, or in connection with other aspects of the invention buoyant.

In another embodiment, the cavities or at least a portion of the cavities are connected by at least one conduit to a holding tank. The holding tank carries water which feeds the root system of the tree through the conduit.

In a preferred embodiment, the bottoms of the cavities are, or the bottom of at least one cavity is, at least partially open. This facilitates either the drainage of water, where water is supplied from the top of the cavities, or the uptake of water where water is supplied from the bottom of the cavities, such as in a situation where the module is placed or floating in a lagoon or holding tank of water. In a preferred embodiment, the water is supplied from the top of the cavities by any suitable means. A drip irrigation system by which the flow of water supplied to the cavities can be adjusted is preferable. In such a system, a preferable arrangement for establishing the openings at the bottom of the cavities is to provide a flexible liner in at least one cavity which has a bottom which is at least partially open, and establish holes for openings in the flexible liner.

In another embodiment, a flow meter can be arranged at the bottom of a cavity or any number of cavities having an at least partially open bottom, in order to gauge the water being discharged from the cavities.

In yet another embodiment, the treatment expedient can be provided within at least one of the cavities, the treatment expedient being any structure, device or material which enhances the remediation of waste water, including readying or preparing the contaminated water for remediation through the root system of the tree. In a preferred embodiment the treatment expedient is a treatment material comprising a zero valence iron, though any suitable expedient can be interposed at a location within a cavity or even outside of a cavity, depending upon the manner in which the cavity will operate.

In a further embodiment, a discharge material is dispersed between the partially open bottom of a cavity and the rooting medium. This prevents plugging of holes which form a partially open bottom or the loss of rooting medium through such holes.

Objects and advantages of the present invention may also be realized by providing a module having at least one cavity, at least partially filling that cavity with a rooting medium, providing a tree suitable for growth in that cavity, and planting the tree in the rooting medium within that cavity. In a preferred embodiment, a module in accordance with this method includes multiple cavities. In a further embodiment, the cavities are elongate permitting the growth of an elongate root system, i.e., enabling the root system to continue to grow in that fashion or to establish a long root system.

Again, the method contemplates either the growth of trees for use in remediating contaminated groundwater or soil, or the growth of the trees within a module for remediating contaminated ground water within the module.

In a preferred embodiment, the method includes the provision of cavities having an at least partially open bottom. In yet a further embodiment, the cavities are lined with a flexible liner, whereby the liner includes openings to create the at least partially open bottom.

In a preferred embodiment, the method includes a step providing a rooting medium which is hydrating and light in weight. Such a rooting medium includes a reed sedge peat, a particularly preferred rooting medium at this time.

In a preferred embodiment, a discharge material is disposed between the at least partially open bottom of a cavity and the rooting medium. This discharge material is preferably a fine glass wool or a similar filter-like or buffer-like material.

In a preferred embodiment, the method further includes a step of supplying water to the cavities. The water supplied can be contaminated water, where the contaminated water is to be remediated, or can be water to be used simply for the growth of the trees. Also, the water can be supplied to the cavities from the top or from the bottom, depending upon the structure of the cavities.

In a preferred embodiment, water discharged from the cavities is sent for further processing or for discharge to the environment. The further processing may be within a like module for remediation, and a different remediation system all together, or even within the same module, particularly in a hybrid open/closed system.

In another preferred embodiment, a tree is removed from a module, and replanted at a remediation site. The tree in this instance could be initially grown at a growth site and transported to the remediation site, or the tree may be grown at the same remediation site at which the tree will be replanted, or even at a different remediation site.

In one preferred embodiment, the removed tree is replanted in a cavity with another module having a plurality of cavities.

In another preferred embodiment of the present invention, the method includes the step of creating a hole in the earth to accept a module with at least one cavity. In one aspect of this embodiment, the hole is deep enough such that water in the aquifer around the hole would feed the root system of the tree through the bottom of each cavity being at least opened. Of course, the aquifer might contain contaminated water, in which case the trees in the module would be remediating such water, or this may be a convenient way of simply growing the trees such that water need not be supplied to the module. One advantage to this latter arrangement would be the ease of removal of the trees from the cavities of the module, another advantage being that once the trees become sufficiently mature, the entire module with the sufficiently mature trees can be transported to a remediation site. Of course, contaminated water can be delivered to the cavity or cavities from another location, whether from the actual nearby contaminated site, a remote site or an industrial discharge or landfill leachate. Preferably, the contaminated water is delivered to the top of the cavity.

BRIEF DESCRIPTION OF THE DRAWINGS

The above and other objects and advantages of the present invention will become apparent, as well a better understanding of the concepts underlying the present invention, by reference to the description which follows and refers to the accompanying drawings in which.

DETAILED DESCRIPTION OF THE INVENTION

The present invention concerns the growth of trees within modular cubes, either for the remediation of waste water from any source or simply the growth of trees for later use in remediation of contaminated soil and/or groundwater. The terms "vegetation" and "trees" are used interchangeably to refer to any plant, plant species, cutting or the like which may be suitable for use in connection with the remediation of contaminated soil or groundwater. The term "soil" as used herein shall refer to any soil media including media made up of gravel, sand and/or soil and other soil-like material. The term "rooting medium" is used to describe any media or mixtures of media suitable for the growth of trees and their root system, and includes soil, peat, other organic matter, synthetic materials and synthetic/organic blends.

Figure 1:
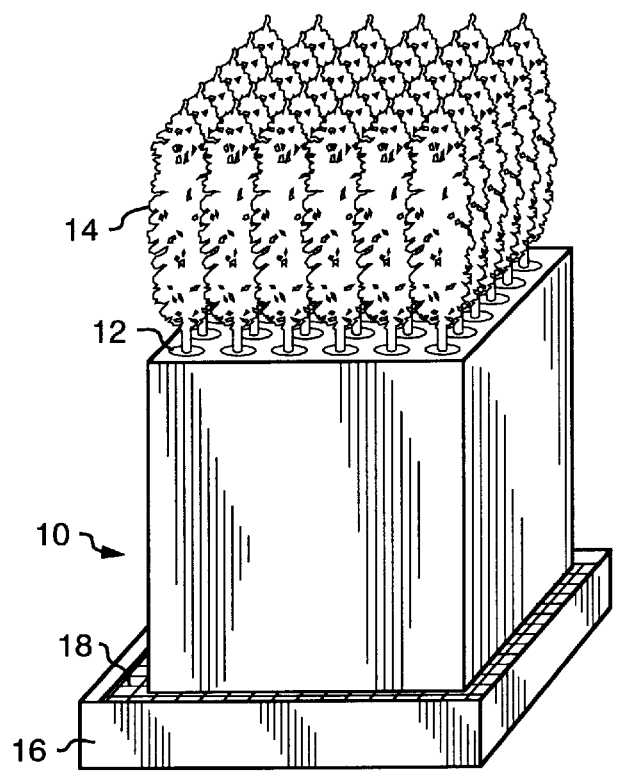
FIG. 1 is a perspective view of a modular cube with multiple trees growing in cylindrical openings in accordance with the present invention.

Referring to the drawings, FIG. 1A illustrates a cube or cubic module generally designated as 10 in accordance with the present invention. In a preferred embodiment, the cube 10 is a solid block of material in which at least one cylindrical cavity 12 is made, and preferably a plurality of cavities or cells are made. To create the cylindrical cavities 12, the material can be bored with suitable tooling, or it can be molded with the cavities from the outset. The cylindrical cavities house the root systems of trees 14, as well as a rooting medium in which the root systems grow. Preferably, the material of which the cube 10 is made is one which is appropriate for environmental conditions at the remediation site or growing site at which the cube will be used to grow trees. Generally, the material preferably possesses insulative properties in order to protect the root systems of the trees 14 from extreme environmental conditions or fluctuations in conditions. In a preferred embodiment, the cube 10 comprises polystyrene or polyurethane. Of course, any other suitable materials may be used, and in fact a special material may not be required at all depending upon environmental conditions. Alternatively, instead of the cube material possessing any desirable characteristics such as insulative properties, the insulation or other characteristics can be built into other components of the overall system, for example in a rigid liner, flexible liner or other expedient.

The cube 10 in a preferred embodiment is freely transportable, but of course the cube may not be easily transportable at all. Rather, it may be intended to be used primarily at the site that it is provided. In one embodiment, the cube 10 can be made to fit widely-used wood pallets or other such devices which facilitate the transport of the cubes 10 either with or without trees. Cube 10 may be moved between different remediation sites by any suitable means or may be relocated within a remediation site for use at various contaminated areas. The cube 10 may also remain in a fixed locale or may replace an existing cube at a site if there is a problem with the cube or trees therein. Further, where cubes are used to facilitate the growth of trees for use in remediation, i.e., grown at a "growth" site remote from a remediation site, the cube or module arrangement facilitates transportation of the trees whether the cube itself is used at the remediation site or the trees are to be harvested for use outside of the cube in which they were transported e.g., in the ground or in a like cube or cavity already on site.

This provides ample flexibility to deal with ineffective cubes or cube cells (i.e., cavities) at a remediation site. For instance, if the majority of the trees in a given cube at a remediation site are dead, dying or have passed their useful life for remediation, it may be more economical to replace the existing cube entirely. Finally, the cube may not be easily transportable at all, but rather it intended to be used primarily at the site that it is provided.

The cubes may be of any suitable shape tailored to the particular needs of the remediation or growth site, or for other reasons of economy or efficiency, such as transportation. Differently shaped cubes, or the positioning of cavities 12 within a cube, may facilitate different needs, including the needs of different trees for growth. Two or more cubes may be placed adjacent to each other or attached in any suitable manner to provide a larger remediation or growth unit.

The cavities 12 in the cube 10 can likewise be of any suitable shape and size, depending upon desired results, the specific application at hand, the type of tree being used, etc. Preferably, the cavities 12 are elongate so as to facilitate the establishment or continued development of a long root system for the trees planted therein. Downward growth or continued downward growth of the root system is encouraged in such a structure as set forth in U.S. Pat. Nos. 5,829,191 and 5,829,192, such downward growth results in a substantially long and narrow root system. The advantages of such a root system include the increased surface area, particularly in specific locations, as well as other advantages discussed in the above patents. As is known, roots do not naturally grow downward to any great depth with respect to most trees. Confining the area in which the roots are grown influences the downward growth.

In a preferred embodiment, the cavities 12 in the cube 10 at least have openings at the bottom of the cube to permit water not used by the tree 14 to be discharged or metered from the individual cells of the cube 10. Such a system is considered an "open system," and any suitable arrangement or expedient for allowing water to drain can be used. Examples of some expedients will be discussed below. The size of the openings can vary, or be variable or varied during operation, depending upon the application and flow requirements, the rooting medium, etc.

The cube 10 in a preferred embodiment sits on a tray 16 which includes an open grid on which the cube 10 rests. The tray 16 catches the water discharged from the cavities 12 (either all cavities, or perhaps only certain cavities). Water captured in the tray 16 is then delivered for further treatment or discharged to the sewer if sufficiently treated. Alternatively, it might be delivered to cavities in the same module, whether such cavities are ones which discharged water into the tray 16 or ones that do not.

Figure 2:
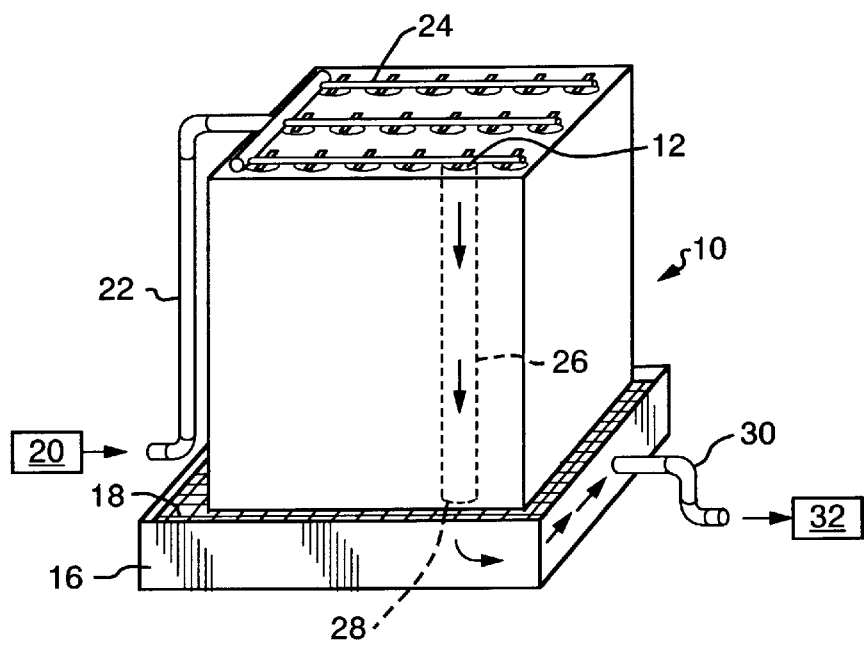
FIG. 2 is a schematic perspective view illustrating the plumbing which might be associated with a modular cube in accordance with the present invention.

The cavity 12 is shown in hidden lines in FIG. 2, which illustrates the plumbing associated with the system in accordance with a preferred embodiment of the present invention. More specifically, a feed 20, for example a pump, delivers water for feeding or waste water for treatment to supply to tube 22. Supply tube 22 branches into feed tubes 24 for feeding the individual trees 14 in a controlled manner. A drip irrigation or like system can be used, and the amount of water delivered can be adjusted depending upon how much water the tree is using, the retention factor of the rooting medium, the size of the drainage openings, the desired retention for the application, etc.

The water or waste water saturates the rooting medium 26, and in an open system, the water or waste water which is either not used by the tree or remains within the saturated rooting medium is discharged at the bottom 28 of the cavity 12. The water or wastewater flows through the grid 18 and is collected in the tray 16. A discharge tube 30 discharges the tray water to a discharge 32. The discharge 32 may be a holding tank, the sewer, the surrounding environment, or further processing to remove further contaminants. The further processing can be in a like cube or cavity or an entirely different system. Where water is not contaminated and is used only for the growth of the trees, the discharged water may be delivered to other cubes for further use in growing trees or could be recycled to the top of the same cube.

The tray water in tray 16 may have been partially remediated, some of its contaminants having been removed as it passed through the rooting medium. Also, it is possible to include a particulate, filter or matrix of some type within or at the bottom of the rooting medium 26 in order to provide removal of contaminants or certain contaminants. The particulate, filter or matrix could include or be made up of substances or compounds which facilitate removal of contaminants, or it could be a device or structure which facilitates removal of contaminants or readies the waste water for further remediation, as explained further below.

Figure 3:
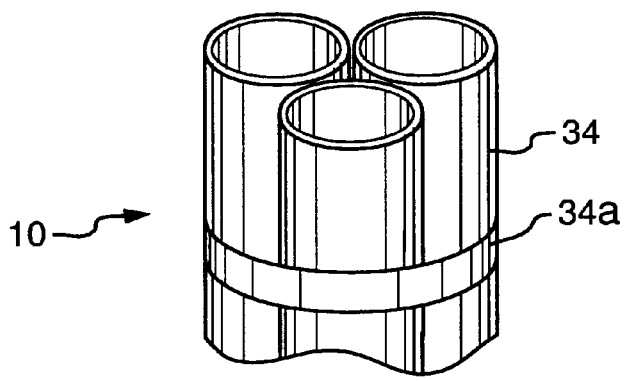
FIG. 3 is a partial perspective view of a module in accordance with present invention, whereby a modular cube comprises a plurality of cylindrical tubes or pipes (made of PVC, ABS, cardboard or other rigid material) attached together.

The cavities 12 of a cube 10 may also be made up of at least one or more hollow tubes 34, preferably cylindrical in shape, that may be attached or arranged in any suitable manner. For instance, as shown in FIG. 3, individual tubes may be banded together by a band or strap 34a. (Only three tubes 34 are shown in FIG. 3, but any suitable number can be arranged together.) Alternatively, the individual tubes 34 can be held together by a frame or box or otherwise contained. Regardless of how arranged or attached, the group of tubes 34 can be used in the same manner as the cube 10.

Preferably, tubes 34 are made of a durable material such as polyvinyl chloride (PVC) or ABS. Indeed, PVC and ABS piping is generally available and could be used in such an application. Cardboard tubing might also be used, though it may need to be lined with a substantially liquid-impervious material, such as a plastic (preferably 3 to 10 mils or more in thickness for durability and strength). Generally, any rigid material might make up individual tubes, which of course need not be cylindrical in shape.

Consistent with the concepts in U.S. Pat. Nos. 5,829,191 and 5,829,192, the cavities 12 are preferably, but not necessarily, elongate to provide for an elongate root system 40. This provides the advantage of efficient use of real estate by establishing the trees in a vertical orientation, and also the large surface area provided by an elongate root system in the area of remediation. In addition, where the cube 10 or a like arrangement in accordance with the present invention is used to grow trees for remediation, the advantages set forth in the above patents can be realized since the root systems grown in such an arrangement will be substantially ready to provide immediate and perhaps targeted remediation.

The dimensions of the cavity 12, tubes 34 or the like cells may be of any suitable length, width, and depth depending upon the amount of waste water provided to the cube or module, and depending as well as on the rooting medium and trees chosen for the site. In the preferred embodiment, each of the cavities 12, tubes 34 or the like are approximately 4 inches to 12 inches to 18 inches or greater in diameter and may range in depth from about approximately 1 to 10 feet or greater depending upon the root-soil attenuation time needed to process the waste water. In the preferred embodiment, approximately 36 cavities may be arranged in 6 rows or 6 columns to establish a cube or module. Such an arrangement easily fits onto a 4 ft by 4 ft forklift pallet. This greatly simplifies transportation of the cube or module to different locations in between or within at least one or more sites.

Tubes or piping similar to tubes 34 described above may also be used to line a cavity 12 made in a block of any suitable material. The purpose of so lining a cavity 12 is to protect the material of which the cube 10 is made. Materials such as polystyrene or polyurethane provide excellent insulative properties to protect trees and their root systems from the environment.

Figure 4:
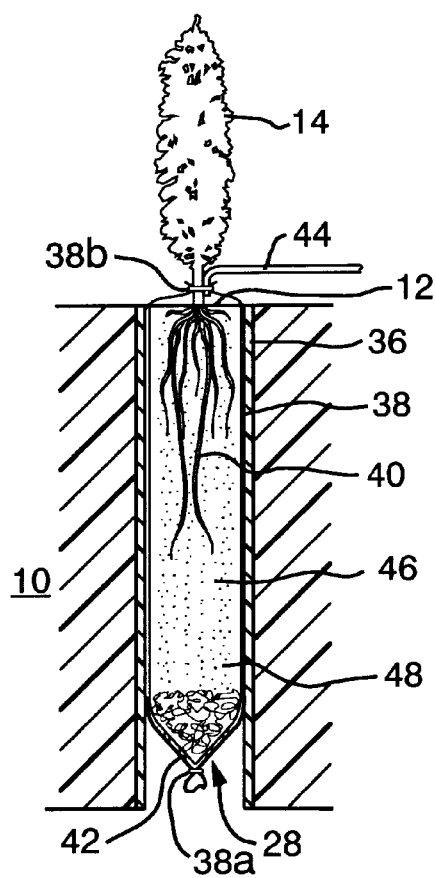
FIG. 4 is a partial sectional view of an individual cylinder of a modular cube having a tree therein and illustrating one possible structure for drainage of water.

Referring to FIG. 4, an occupied cavity 12 of a cube 10 is illustrated in accordance with a preferred embodiment of the present invention. The cavity 12 is lined with a hollow tube 36. This hollow tube 36 protects the walls of the cavity 12 as formed in cube 10, particularly when the cube material might otherwise be damaged or subject to wear.

In addition, as shown in FIG. 4, the cavity 12 is further lined with a flexible liner 38. The flexible liner 38 can be of any suitable material, but is preferably a plastic as described above and also in U.S. Pat. Nos. 5,829,191 and 5,829,192. This will protect the cavity walls from moisture penetration and root penetration which might occur. The flexible liner further serves many of the same purposes as explained in these patents, which are incorporated herein by reference, including the usefulness in harvesting and transplanting of the tree or its root system 40.

The flexible liner may also protect a tubing made of cardboard, or if used without a rigid liner, it may protect the cube material. The flexible liner 38 also provides a manner in which to seal the top and bottom of the cavity 12 as shown in FIG. 4. At the bottom of cavity 12, the flexible liner 38 is shown within the bounds of cavity 12, i.e., not below the bottom of cube 10. However, any suitable arrangement can be made with respect to the bottom of liner 38 and the bottom of cube 10 and/or cavity 12. The flexible liner 38 is shown as tied with a liner tie 38a at the bottom of cavity 12. A liner tie 38b is provided at the top of cavity 12, the liner 38 is preferably brought close to the trunk of the tree 14 so that little or no rain water feeds the tree 14 and its root system 40. Of course, there may be situations where rain water or a certain amount of rain water (or supplemental water other than waste water) is desired, and in those applications, the flexible liner 38 can be opened somewhat at the top. Accordingly, in order to supply water or waste water to the tree 14 and its root system 40, a supply tube 44 is arranged so that it supplies the water or wastewater within the flexible liner 38 from the top. At the bottom of cavity 12, the flexible liner 38 include openings 42, through which water not used can be discharged into tray 16 or elsewhere, as set forth above.

Within the cavity 12 is the rooting medium 46. As set forth above, the rooting medium may be any appropriate medium, including the soil or any appropriate organic, inorganic or semi-organic material, a synthetic material or a partially synthetic material. Mixtures of any suitable type are acceptable, including the addition of a reed sedge peat, a sphagnum peat or any other type of peat. Factors to consider in selecting a rooting medium include the flow requirements of the waste water which must be drawn through the rooting medium in cavity 12, and the weight of the medium when dry or saturated (which affects the portability of a cube with occupied or partially occupied cavities).

In a preferred embodiment, a reed sedge peat is used as a rooting medium. Alternatively, any equivalent or substantially equivalent peat can be used. The properties of a reed sedge peat include its hydrophilic or hydrating nature, as opposed to being hydrophobic like many other materials. By hydrating, it is meant that it readily hydrates and gives great structure and nutrients for root growth. Reed sedge peat is more highly decomposed than most peats, making it very stable in soil (where a mixture is used). It also possesses a high level of microbial activity and a pH level near neutral (i.e., between 6 and 7). It is more porous than other rooting mediums (like soil), and its organic surface area is greater than other rooting mediums to facilitate chemical reactions for remediation. It provides for great physical interaction with waste water. It is light in weight, not having the weight and density of rooting mediums such as soil or even inert mediums such as vermiculate. It does not compress from weight and occupies a lot of volume. Reed sedge peat is available from Dakota Peat & Equipment in Grand Forks, N.D.

In determining which rooting medium to use, as indicated above, the flow requirements of the waste water must be considered. That is, one should consider the amount of water flow required or desired through the rooting medium. The factors to consider include the type of contaminant, the specific site and like factors. The retention of the waste water within the cavity 12 can then be adjusted so that the water is retained within the medium for a longer period of time before discharge, providing a greater opportunity for chemical reactions and absorption into the root system 40. The reed sedge peat, for example, provides for longer retention of the water within the cavity 12.

In a preferred embodiment, a discharge material is provided at the bottom of the liner 38 adjacent to the holes 42, separating the rooting medium 46 from the holes 42. The discharge material 48 can be of any suitable material which acts as a buffer or a filter. It permits water to flow through it, yet does not allow the rooting medium to flow through it and potentially plug the openings 42 or flow out of the openings 42. The discharge material 48 can be of any suitable buffer or filter material. At present, it is preferred that the discharge material be a fine glass wool, a fine angel hair polyester matting or like materials. These materials will allow water to flow through, but will not permit the rooting medium to plug the openings 42.

As one skilled in the art will recognize, the system may be used to treat pre-polished waste water (already treated water), may pre-polish waste water or treat any waste water that may or may not have been processed previously.

Figure 5A:
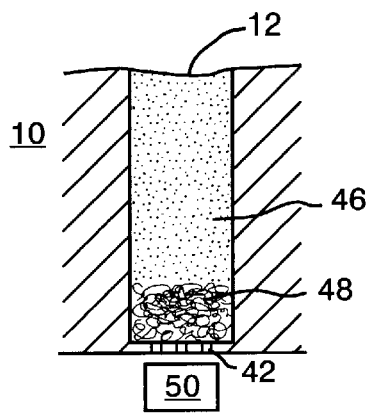
FIG. 5A is a partial sectional view of the bottom portion of an individual cylinder in accordance with another embodiment of the present invention.

As suggested above, there are several ways in which the cavity 12 can be established and several ways in which to discharge unused water in an open system. Referring to FIG. 5A, a cavity 12 is formed within a cube 10 such that it is not fully open at the bottom of cube 10. Instead, below the rooting medium 46 and the discharge material 48, there is a portion of cube 10 through which openings 42 are provided. These openings serve the same purpose as the openings 42 in the flexible liner 38 of FIG. 4, except that the openings 42 in FIG. 5A are made within that portion of the cube 10 which underlies the cavity 12. A flexible liner, a rigid liner or both can be used with this arrangement as well if desirable.

Also shown in FIG. 5A is a flow meter or lysimeter 50. The flow meter 50 enables one to monitor the discharge of water from cavity 12, i.e., gauge the amount of water moving through the cavity 12 and the rooting medium therein. Information from the flow meter 50 may indicate whether the amount of waste water being provided to cavity 12 should be altered, whether rain or other supply water might be needed to supplement the root system 40 to keep it healthy, whether the rooting medium is not retaining or releasing water as expected or planned (and thus whether it should be changed), and provide additional information which would be helpful in the operation of the system.

Preferably, the flow meter 50 is situated at or near the bottom of cavity 12, and might even be placed within the bottom of the cavity 12. The flow meter 50 can provide data to a data logger through hard wiring or in any other suitable manner, such as signals of any type. The flow meter 50 might even be placed within the cavity 12 at various depths if monitoring at those depths is required (i.e., as opposed to at the bottom). A flow meter 50 can be provided for each cavity 12 or a number of cavities. Flow meters 50, each relating to one or more cavities 12, can be linked to a single data logger or several data loggers can be linked together. In this manner, the activities with respect to certain trees or groupings of trees can be compared. U.S. Provisional Application Ser. No. 60/075,473 filed Feb. 20, 1998, discloses further information on such flow meters and their use, and is incorporated herein by reference as if fully set forth.

Figure 5B:
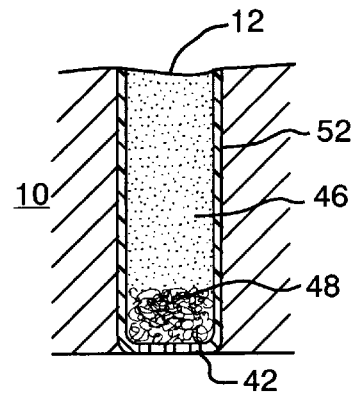
FIG. 5B is a partial sectional of the bottom portion of an individual cylinder in accordance with yet another embodiment of the present invention; .

FIG. 5B illustrates an arrangement by which a rigid tube 50 having a bottom with openings 42 is employed. As shown, the rigid tube 52 is within a block of material, though it could be used individually or in a group of like tubes, as illustrated in FIG. 3.

Figure 5C:
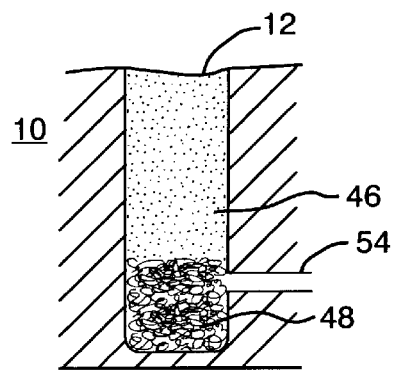
FIG. 5C is a partial sectional of the bottom portion of an individual cylinder in accordance with yet another embodiment of the present invention.

FIG. 5C illustrates yet another embodiment, whereby cavity 12 is formed within a cube 10 and includes a closed bottom. Of course, construction can be within a block of material or with individual tubes as in FIG. 3, or otherwise. Below the rooting medium 46 is provided the discharge material 48. Also provided is a discharge outlet 54 which can be directed slightly downward to facilitate the flow of water as the water in the cavity 12 reaches the level of the discharge outlet 54 (or the flow may be pump assisted). The discharge outlet 54 is shown at or just below the level of the discharge material 48 so that water flows through the discharge material 48 and through the discharge outlet 54 without the rooting medium 46 flowing out of the outlet 54 or plugging the outlet 54. Of course, the discharge outlet 54 can be provided at any appropriate level, at the very bottom of the wall of cavity 12 or even through the bottom of cavity 12, whereby the discharge would be similar to that shown in FIGS. 5A or 5B, but an outlet is provided to carry the water to a location as opposed to simply draining out of the bottom as in FIGS. 5A and 5B. Of course, like any of the other systems disclosed herein, the discharge material 48 may not even be required.

Most of what has been disclosed above relates to open systems, whereby water is supplied to the cavity 12 from the top of the cavity 12 and drains through the bottom or anywhere in between. In a "closed system" in accordance with a preferred embodiment of the present invention, the water supplied to the cavity 12 will be only the water that is required for the healthy growth of the tree 14 and its root system 40. Such a closed system can be arranged in any suitable manner, whereby water can be supplied from the top of cavity 12 or from the bottom of cavity 12. Many of the arrangements discussed above can be used with little or no modification. For instance, the openings 42 can be closed, and the water being supplied to cavity 12 need only be the amount of water that the tree 14 and its root system 40 will use. Alternatively, the bottom of the cavity 12 can be fully opened or partially opened and the cavity 12 within the cube 10 or otherwise can be allowed to draw water up through the bottom of cavity 12 in order to feed the root system 40. Here, the water is drawn from the bottom by capillary action, and the cavity 12 and the cavity 12 may act much as the lined tree hole disclosed in U.S. Pat. Nos. 5,829,191 and 5,829,192. A hybrid might also be used, as described above. It would have some cells or cavities operating by discharging unused water out of the bottom and others that would not discharge at all.

Such closed systems could be used as primary remediation systems or as secondary remediation systems. In closed systems where a cube is immersed or floating on the water, no water needs to be supplied to the cavity 12. This type of system is particularly useful as a secondary system for enhancing transportation and cleanup.

Figure 5D:
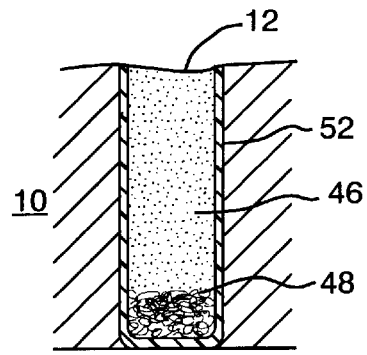
FIG. 5D is a partial sectional of the bottom portion of an individual cylinder in accordance with yet another embodiment of the present invention.

FIG. 5D illustrates another type of closed system, whereby water is supplied to the cavity 12 from the top, as shown in FIG. 4, or elsewhere by some other expedient. A rigid tubing 52 is provided, and contains rooting medium 46. It may also include a liner 38 or a material 48 which is similar to the discharge of material, but neither is required. It can, however, serve to collect water at the bottom so that the rooting medium 46 is not entirely saturated near the bottom of the cavity 12, and thereby the reactions within the rooting medium which facilitate contamination removal will not be inhibited by excess water. As shown in FIG. 5D, the rigid tubing 52 is within a cube 10. This might be desirable for the insulative properties of cube 10 if cube 10 is made with an insulation type material. Of course, the tube 52 can be similar to the arrangement shown in FIG. 3.

Figure 5E:
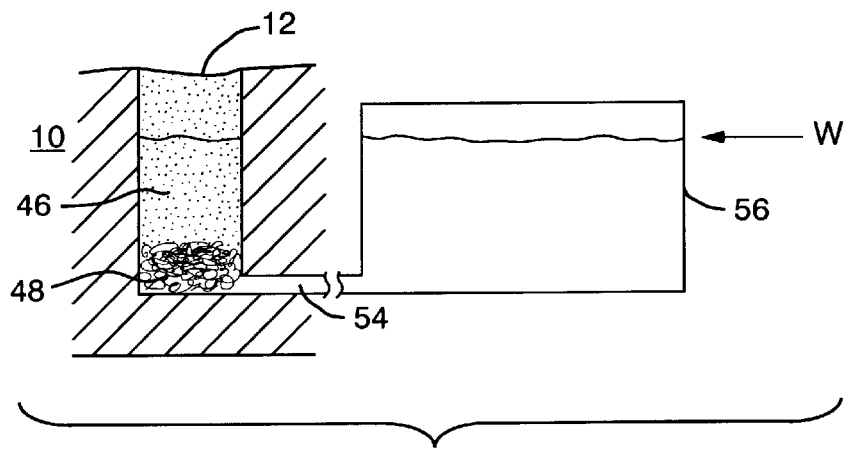
FIG. 5E is a partial sectional of the bottom portion of an individual cylinder and a holding tank in accordance with yet another embodiment of the present invention.

FIG. 5E illustrates a closed system whereby a cavity 12 is formed in a cube 10, and cavity 12 is filled with the rooting medium 46 and discharge material 48. A discharge outlet 54 is provided, connecting the cavity 12 or a plurality of cavities 12 with a holding tank 56. The holding tank 56 could be large or small, and could be the main holding tank for an overall system or a secondary holding tank which is fed from a main holding tank. This closed system permits the water to flow automatically from the holding tank 56 into the cavity 12 from the bottom or at any other appropriate location. The holding tank 56 will feed the water into cavity 12 automatically as it maintains the water level W, following equilibration of the water in the holding tank 56 and the water in the cavity 12. The discharge material 48 might be provided at a higher level, i.e., closer to or at the water level W, or at any suitable level or location.

In another embodiment, the cube 10 could be arranged to float on the water to be used for tree growth or with the water to be remediated. Where a polystyrene or like material is used for the cube 10, the floating of the cube 10 is relatively easy because of the material itself. Pontoons or other flotation-assisting expedients might be required for other instances, and stabilizers might also be required. Whether immersed in water or floating on the water, the root system 40 should be at least in part above the water level, and in many instances it will be entirely above the water level, the water reaching the root system by capillary action. In many cases, water loving plants would reach into the water level itself.

In another embodiment, a hole can be established in the earth as set forth in U.S. Pat. Nos. 5,829,191 and 5,829,192, except that the hole would be large enough to accept a module or cube 10, however constructed. One construction might be a narrow module with a plurality of cavities. In any such arrangement, an entire module can be placed in the hole, the depth being determined by application, but preferably being such that the bottom of the module is near or within the aquifer. The bottom of the cavities can be open or partially open, and the cavities would act much as the lined tree hole disclosed in the above patents. The module could be sized also so that that portion of the tree extending from the module is fully or at least partially above the surface of the ground to maximize its exposure to the air and light. The advantage of such a system is that more control can be obtained over trees used in accordance with the above patents, and that trees grown off site in a cube can simply be transported to the remediation site and placed in a hole.

In addition, a single cavity, which might be made up of any of the materials disclosed herein or like materials, can be disposed in the ground, and contaminated water from any source might be delivered to the single cavity, or a plurality of single cavities, such that the contaminated water would be "cleansed" as it made its way through the cavity towards the groundwater. In such an embodiment, the root system itself will facilitate cleanup of the contaminants, as could the rooting medium or any other treatment expedient, discussed below, provided within the cavity. The contaminated water can be pumped or delivered to the cavity in any suitable manner, whether by pump or gravity feed. The contaminated water might be from an industrial discharge, a well, a landfill leachate, a leachate reservoir, regardless of where captured, or any other location. The cavity can be constructed in any suitable manner, including any of those described or illustrated in the above U.S. patents, or as described herein. Preferably, some type of liner is provided in order to facilitate concentration of the root growth, which provides a greater surface area, particularly in length as the water delivered to the cavity leaches downward towards the groundwater.

The enhancement of remediation within a cavity 12 or an overall system can be accomplished by providing a remediation-assisting material or treatment material within one or more cavities 12 or at some point following discharge of water from the cavities 12, possibly in the tray 16. Whether simultaneous or subsequent, the use of a treatment material can greatly enhance the remediation of the waste water. The treatment material could be placed at 48 as part of the discharge material or in place of the discharge material or near the discharge material (above or below). Some treatment materials might act as a filter in the same manner as the discharge material 48, and thus the discharge material itself would not be required.

An example of a treatment material is a zero valance iron ($Fe^O$) which remediates a target contaminant or a number of contaminants, via a chemical reaction which will degrade, e.g., chlorinated hydrocarbons. A zero valence iron can be obtained in a processed form from Cercona of America, Inc. of Dayton, Ohio. As with most treatment material, the size of the particles, matrix, etc. should be considered depending upon flow requirements, etc. Other examples of treatment materials which might be provided within or make up a particular, filter or matrix include ceramics impregnated with microbes, iron sesquioxiede, organic compost materials (such as sphagnum peat or reed sedge peat), activated carbon and ion exchange resins. These and other treatable materials are suitable to treat contaminants, whether by microbial reaction or chemical or physical reaction (including a catalytical bonding action).

The incorporation of any treatment expedient, whether it be a material, structure or device, can be advantageous. Such a treatment expedient could be contained within the cavity 12 or in the area of discharge at the bottom of cavity 12. The waste water being discharged would thus be exposed to the treatment expedient and will thus be further remediated or readied for some other remediation process. A treatment expedient may also be arranged just prior to the cavity 12, whereby waste water would be "pre-treated" before entering the cavity 12. In the same vein, the treatment expedient, preferably a material, could be provided at the very top of the cavity 12 for a similar pre-treatment process, which would pre-treat waste water prior to the waste water reaching the root system or the majority of root system through which the water would be used. One example of such a pre-treatment would be the use of an organic material such as a sphagnum peat or a reed sedge peat, both of which could separate organics from the water. This is advantageous, for instance, when a waste water comprises oily water.

In U.S. Provisional Application Ser. No. 60/065,777, filed Nov. 17, 1997 and co-pending application entitled Treatment Material Pumping System, filed Nov. 17, 1998, the use of treatment expedients (materials, structures and devices) is further explained. These applications are incorporated herein by reference in their entirety as if they had been fully set forth herein.

Several cubes 10 can be located adjacent to one another to form a larger system, either for increased capacity due to flow requirements at a site, or so that water being discharged from one cube can be pumped or delivered directly to a second cube for further processing of the waste water. Where several cubes are arranged adjacent to one another, supply tubes for supplying waste water for remediation or water for growth can be arranged conveniently to run from cube to cube to thus provide a water supply, via drip irrigation or otherwise, to several cubes at once. All that would be required is an extension of the tubing 22 and/or tubing 24 as shown in FIG. 2.

While the foregoing description illustrates preferred embodiments of the various techniques in accordance with the present invention, it should be appreciated that the invention also covers various permutations of the foregoing described features and that certain modifications may be made that are encouraged to be made in the foregoing without departing from the spirit and scope of the present invention which is defined by the claims set forth immediately hereafter.

What is claimed is:

1. A method of remediating contaminants from water or soil at a remediation site comprising the steps of:
   a. identifying a contaminant to be remediated from the water or soil;
   b. providing a module having at least two cavities;
   c. at least partially filling the cavity with a rooting medium;
   d. selecting and providing trees suitable for growth in the cavities and treatment of the identified contaminant in the contaminated water or soil at the remediation site;
   e. planting the trees having root systems in the rooting medium within the cavities; and
   f. exposing the contaminated water or soil from the remediation site to the root systems of the trees to treat the identified contaminant in the contaminated water.

2. The method in claim 1 wherein said module includes multiple cavities, and the cavities are elongate permitting the growth of an elongate root system.

3. The method in claim 2, wherein the bottom of at least one of the cavities is at least partially open.

4. The method in claim 3, including the step of providing a flow meter at or adjacent the bottom of one or more cavities to gauge water usage.

5. The method in claim 3 further including a flexible liner, and wherein the at least partially open bottom of the at least one cavity comprise a plurality of openings in said flexible liner.

6. The method in claim 3, wherein each cavity is at least partially open at the bottom, and further including the step of creating a hole in the earth to accept the module, the hole being deep enough that water in the aquifer around the hole will feed the root system of the tree through the at least partially open bottoms of the cavity.

7. The method in claim 1, including the step of providing a rooting medium which is hydrating and light in weight.

8. The method in claim 7, wherein the rooting medium comprises a reed sedge peat.

9. The method in claim 7, further including a discharge material disposed between said at least partially open bottom of the at least one cavity and said rooting medium, said discharge material maintaining said open bottom free of rooting medium to provide for flow of water.

10. The method in claim 9, wherein said discharge material is a fine glass wool.

11. The method in claim 9, further including the step of supplying water to the cavities.

12. The method in claim 11, further including the step of collecting water discharged from the cavity, and moving the discharged water for further processing or for discharge to the environment.

13. The method in claim 12, including the step of providing a basin to catch discharged water, and the step of providing a pump to supply water to the cavities.

14. The method in claim 1, including the step of removing at least one tree and its root system from at least one cavity at the remediation site, and replanting the removed tree at the remediation site.

15. The method in claim 14, wherein the removed tree is replanted in a cavity of a module having a plurality of cavities.

16. The method in claim 1, further including the step of supplying contaminated water to the cavities.

17. The method in claim 1, further including the steps of creating a hole in the earth to accept the module and delivering contaminated water to the cavity.

18. The method of claim 1, further comprising the step of controlling the time that the water is retained in the cavities.

19. The method of claim 1, wherein method further includes the step of transporting the module to or from the remediation site.

* * * * *

UNITED STATES PATENT AND TRADEMARK OFFICE
CERTIFICATE OF CORRECTION

PATENT NO. : 6,189,262 B1
DATED : February 20, 2001
INVENTOR(S) : Edward G. Gatliff It is certified that error appears in the above-identified patent and that said Letters Patent is hereby corrected as shown below:

Column 6,
Line 61, "well a" should read -- well as a --

Column 7,
Line 5, "with present" should read -- with the present --
Line 16, "sectional of" should read -- sectional view of --
Line 19, "sectional of" should read -- sectional view of --
Line 22, "sectional of" should read -- sectional view of --
Line 25, "sectional of" should read -- sectional view of --

Column 8,
Line 29, "it intended" should read -- it is intended --

Column 9,
Line 6, "discharged" should read -- discharge --

Column 13,
Line 23, delete "and the cavity 12"

Column 16,
Line 21, "comprise" should read -- comprises --
Line 28, "bottoms" should read -- bottom --
Line 63, "wherein method" should read -- wherein the method --

Signed and Sealed this

Eighteenth Day of December, 2001

Attest:

JAMES E. ROGAN
Attesting Officer       Director of the United States Patent and Trademark Office